United States Patent Office 3,522,391
Patented July 28, 1970

3,522,391
TRANSMISSION MEASURING METHOD UTILIZING SELF-MEASURING TECHNIQUES TO DETERMINE TRANSMISSION MEASUREMENT ERRORS DUE TO IMPERFECTIONS OF AN AUTOMATIC TRANSMISSION MEASURING SET
Walter J. Geldart, Holmdel, and Raymond G. Schleich, Lincroft, N.J., assignors to Bell Telephone Laboratories, Incorporated, Murray Hill, N.J., a corporation of New York
Filed Aug. 14, 1967, Ser. No. 660,352
Int. Cl. H04b 3/46; H04m 1/24
U.S. Cl. 179—175.3         10 Claims

ABSTRACT OF THE DISCLOSURE

An automatic transmission measuring set is utilized to self-measure the transmission characteristics of its internal transmission components with the same measuring instrumentation that is used to measure the transmission characteristics of two port electrical networks. The self-measurements are conducted by isolating the causes of selected test signal disturbances that adversely affect test measurements and measuring the signal level induced in the measuring instrumentation due to each isolated disturbance. The isolation is achieved by selective signal injections, test circuit interruptions and bridging measurements of the various transmission components of the measuring set.

FIELD OF THE INVENTION

Figure 1:
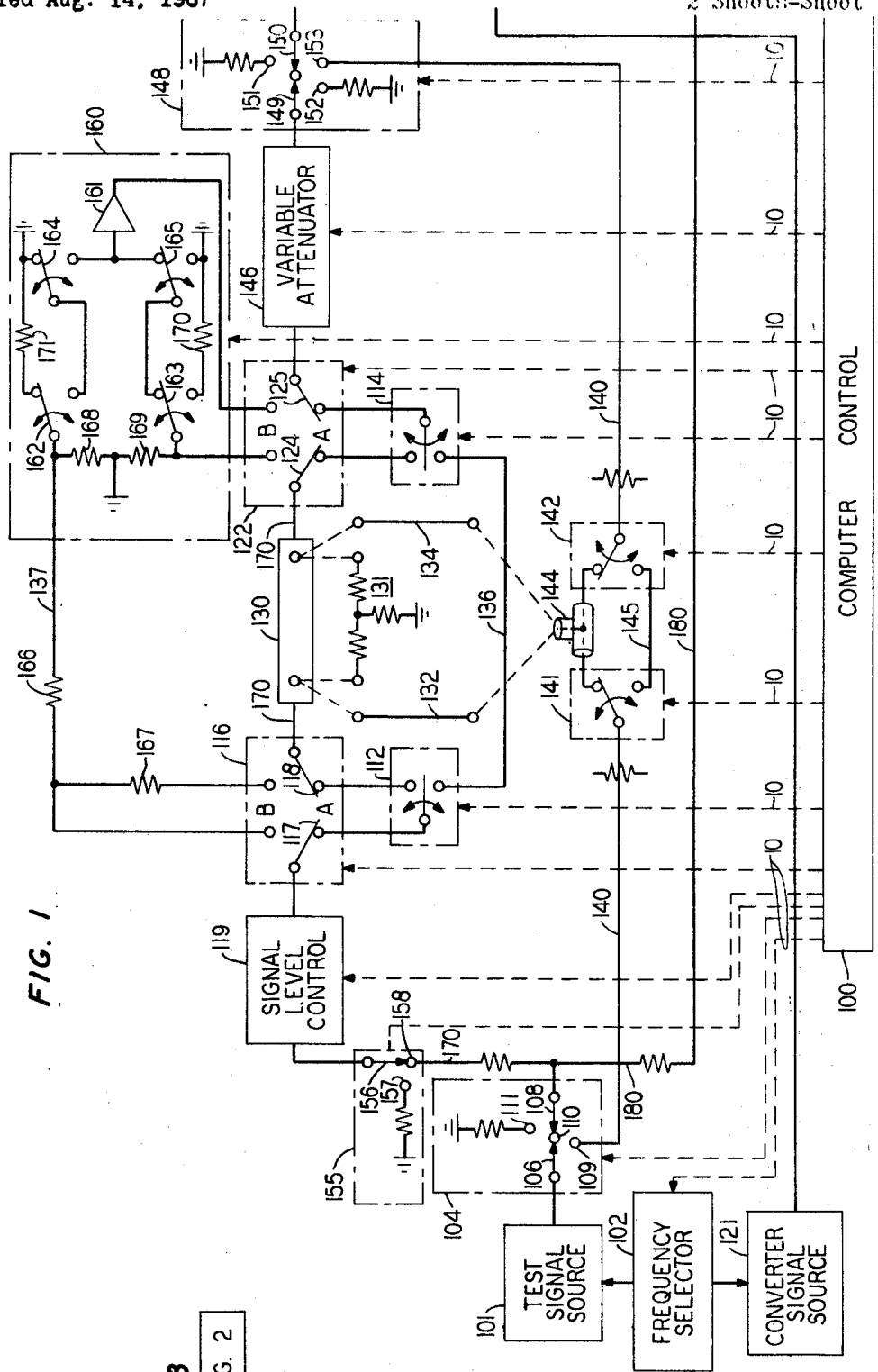

This invention relates to transmission measurement techniques designed to utilize an automated transmission measuring set to self-measure the transmission characteristics of its various internal signal transmission components. The measurement values so procured permit the determination of the accuracy of the transmission measurements of electrical networks as influenced by imperfections, misterminations, and signal interactions of the various transmission components of the transmission measuring set.

BACKGROUND OF THE INVENTION

The accuracy of measurements by a transmission measuring set of the transmission characteristics of electrical networks is limited by test signal errors, such as distortions and added signal components, introduced into the test signals by the transmission characteristics of the various internal signal transmission components of the measuring set. In making such measurements over a long period of time, further errors are introduced into the test signals as a result of the changing transmission characteristic responses of the various internal signal transmission components of the measuring set. Typical sources of the aforementioned test signal errors, which cause inaccuracies in the test signals, are test path impedance imperfections which cause undersirable signal reflections and attenuations and hence add additional signal components to the actual test signal. Another source of errors, of concern herein, is the nonlinear signal level response of the internal transmission components, including frequency converter circuits included in the test circuitry to alter the test signal frequency for measurement purposes. Additional errors are introduced into the test signals by crosstalk of the various internal transmission components and the pickup of spurious signals from both external and internal power sources.

One solution to the aforementioned difficulties is to specifically design a transmission measuring set to attain a fixed level of high accuracy by minimizing the effect of the aforementioned sources of undesirable signal components and hence use the measuring set assuming this high accuracy. This attainment of a predetermined fixed high accuracy is very difficult to achieve, however, and the expense of added refinements in design to improve the accuracy of the transmission measurements is generally out of proportion to the actual improvement of the accuracy attained. A more feasible solution is to determine before assembly the transmission characteristics of each internal transmission component of the measuring set and to utilize these known characteristics to predict the accuracy of the transmission measurements at various test signal amplitudes and frequencies. This solution is still unsatisfactory, inasmuch as the transmission characteristics of the internal transmission components may change with age and temperature. Subsequent tests to determine these changes requires the disassembly of the measuring set. Additionally, these transmission characteristics of the internal transmission components are substantially altered by the surrounding measuring set environment. These solutions, hence, are not satisfactory where transmission measurements of electrical networks are made over a long period of time and a reliable continuing indication of the accuracy of these transmission measurements is desired.

It is therefore an object of the invention to permit the accurate determination of the accuracy of transmission measurements by determining the influence upon these measurements due to the transmission characteristics of a transmission measuring set by accurately measuring the actual working transmission characteristics of its internal signal transmission components.

It is another object to measure these transmission characteristics within the context of the actual transmission measuring set environment.

It is an additional object of the invention to utilize the instrumentation of the transmission measuring set to self-measure the transmission characteristics of its internal signal transmission components.

SUMMARY OF THE INVENTION

The aforementioned and other objects are achieved in accord with the present invention by measuring techniques utilizing auxiliary measurement apparatus in combination with the transmission measuring set to permit it to self-measure its own internal impedance and signal level response transmission characteristics with the identical instrumentation used to measure the transmission characteristics of the electrical networks tested. A typical transmission measuring set to which the principles of the invention are readily applicable is disclosed, for example, by D. Leed and O. Kummer in the Bell System Technical Journal, vol. 40, pp. 841–884, May 1961.

The impedance of imperfections of the internal transmission components are measured by severing the input and output terminals of the test path, in which the electrical networks are inserted, from the measuring set and sequentially bridging the severed portions of the test path across an auxiliary signal transmission path included in the measuring set. The bridging connections are made to the test device mounting terminal connections of the test path which accept the electrical network, and the severed terminals of the test path are terminated in finite impedances substantially equalling the characteristic impedance of the test path and of the other transmission components of the measuring set. The attenuation of the test signals applied to the auxiliary path due to the aforesaid bridged test path portions is measured to permit the determination of the test path impedance and its effect on the accuracy of transmission measurements.

The transmission measuring set disclosed in the aforementioned Bell System Technical Journal article includes frequency conversion apparatus to convert all the test signals to a common frequency for measurement purposes. The linearity test to determine the signal level response of the measuring set and its frequency conversion apparatus utilizes a plurality of adjustable attenuation devices included in the test signal transmission path, both prior to and subsequent to a frequency converter and other common active signal transmission devices connected to the test path. The adjustable attenuation devices are simultaneously adjusted in concert so that an increase in attenuation prior to the potential nonlinear device under test is matched by a decrease in attenuation subsequent to the device or vice versa. Changes in the test signal amplitude at the output of the subsequent attenuation device due to the aforementioned concerted adjustment of the adjustable attenuation devices are an indication of the linearity of the signal level response of the measuring set and its frequency conversion apparatus. The linearity of the signal level response of the measuring set and the frequency conversion apparatus is measured according to the invention while rapidly sampling the test signal as alternately transmitted, via an auxiliary standard path connection and a connecting network pad inserted in the test device mounting included in the test path. The rapid sampling technique permits the accurate testing of the signal level response linearity of the test signal as alternately traversing both the aforedescribed signal paths without being adversely affected by shifts in the operating level of the test signal source and the signal detector.

Since the accuracy of the sampling technique, which is used in measuring electrical networks, is largely dependent upon the known relative signal transmission characteristics of the two signal transmission paths sampled, a thorough accuracy test requires that the ratio of these characteristics be measured. This accuracy measurement is accomplished by inserting a zero loss coaxial connection into the test device mounting and rapidly alternatively sampling the test signal as transmitted by the test device mounting and the parallel standard path. The alternate test signal levels measured represent the relative signal transmission ratio of the two transmission paths and hence are a measure of the accuracy of the transmission measurements.

A feature of the invention is the advantageous utilization of the measuring instrumentation of the transmission measuring set to self-measure the transmission characteristics of its internal transmission components, thereby establishing reference signal accuracy measurements on a scale common to the regular test transmission measurements. This common scale technique positively relates the measured accuracy of the measuring set to the actual test transmission measurements and, in addition, permits certain of the measurements to be used to offset test signal measurement distortions due to certain measuring set signal transmission inaccuracies.

Another feature of the invention is the provision of an auxiliary signal source to generate a reference signal to permit a sampling technique to be used to conduct crosstalk and noise measurement tests and thereby achieve signal measurements conforming in form to the regular test transmission measurements of electrical networks which are made by the sampling technique. These measurements are made by severing the interconnection of the test signal source and the signal detector at selected intervals of the various signal transmission paths and measuring the resulting signal level. A variable amplification apparatus is also included in combination with the auxiliary signal source to compensate for the attenuation of the test signal within the regular test path of the measuring set due to the disconnection of certain test path amplifiers which occur in conducting certain aspects of the test.

A further feature of the invention is the use of constant impedance switching components in the measuring set to permit the rapid sampling of test signals transmitted, via the auxiliary standard path connection and the connecting network pad in the linearity test without being influenced by changes in the test path characteristic impedance as the before-mentioned adjustable attenuation devices are adjusted in concert.

Yet another technique of the invention permits the measurement of test signal distortions due to the generation of spurious frequency signals equalling the common frequency of the converted test signal due to the intermodulation of harmonics of the test and heterodyning signals.

DRAWINGS

Figure 2:
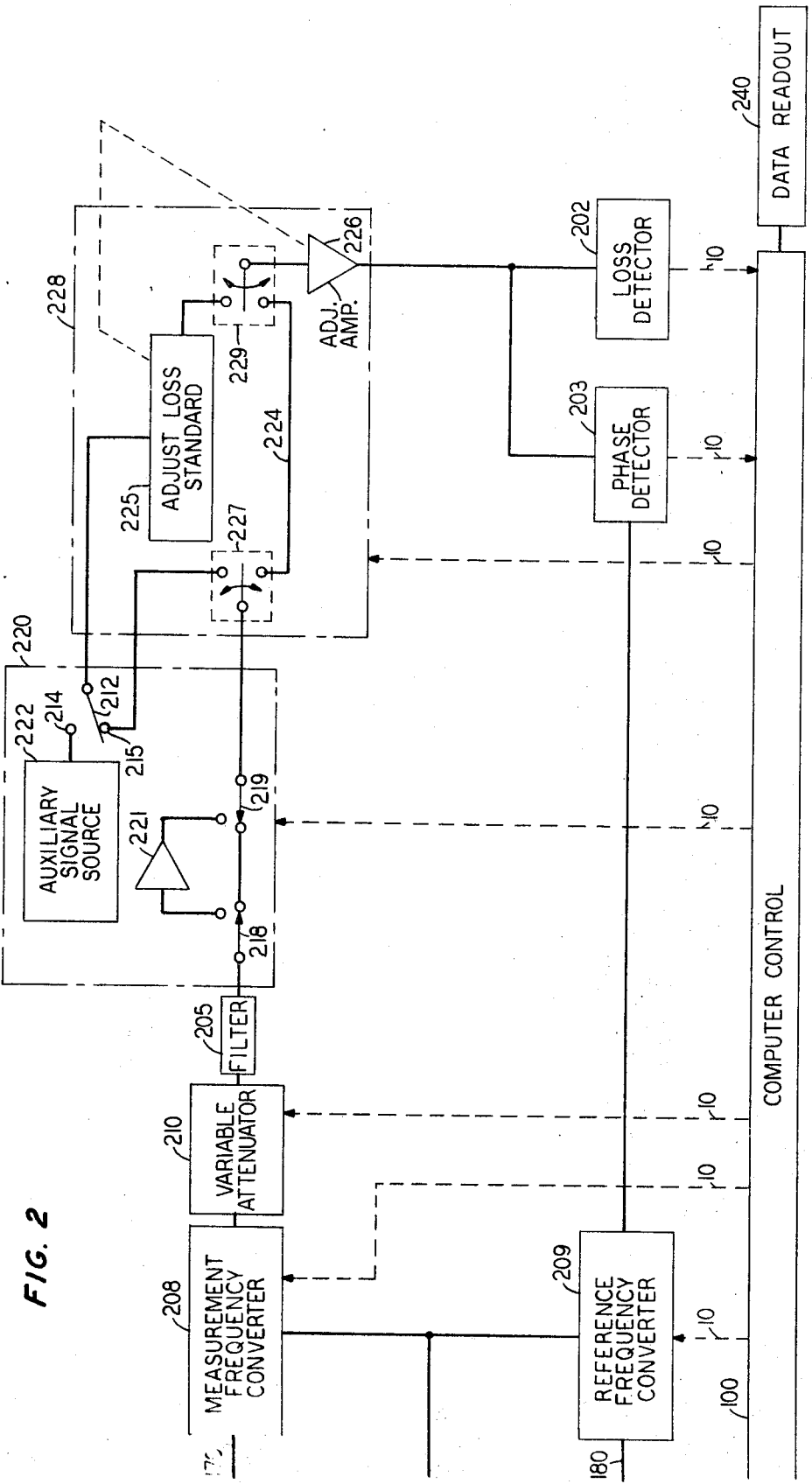

A complete understanding of the invention and a further description of its many objects and features may be obtained upon consideration of the following detailed description of the self-measuring techniques of the invention, as applied to a transmission measuring set, taken in connection with the accompanying drawings, in which:

FIGS. 1 and 2 are a block diagram illustrating a transmission measuring set to which the self-measuring techniques of the invention are applied; and FIG. 3 shows the relative positions of FIGS. 1 and 2.

DETAILED DESCRIPTION

FIGS. 1 and 2, combined as shown in FIG. 3, illustrate a transmission measuring set to which the principles of the invention are applied in order to measure the transmission characteristics of its own internal signal transmission components. The transmission measuring set in accord with the principles of the invention self-measures the transmission characteristics of its internal signal transmission components in terms of the insertion loss and phase shift they induce in a test signal. These measurements may be utilized as measured or converted into standard network parameters such as scattering parameters. A theoretical discussion of at least one method of transforming these measurements into scattering parameters may be found in "Microwave Measurements" by E. L. Ginzton, McGraw-Hill, New York, 1957, and hence is not discussed herein.

The transmission measuring set disclosed herein is similar to the transmission measuring set described in detail in the aforementioned Bell System Technical Journal article and comprises a plurality of signal transmission paths interconnecting a test signal source 101 to the loss and phase detectors 202 and 203. One of the transmission paths 170 is designated the test path and has a test device mounting 130 which accepts the electrical networks to be tested. Another of the transmission paths 180 is designated the reference path and supplies a reference signal to the phase detector 203 to provide a standard reference phase with which phase changes in the test signal may be compared. The frequency converters 208 and 209 are included in the signal transmission paths 170 and 180, respectively, to transpose the various test and reference signal frequencies to one common measurement signal frequency for the purposes of the measurements made by the loss and phase detectors 202 and 203.

The switching arrangements of the various signal transmission paths and the selection of test signal frequencies may be manually controlled or may be under the direct control of either a special purpose logic circuit or a general purpose computer 100. The logic circuit or computer 100 is programmed to coordinate the selection of test signal frequencies and the selection of particular signal transmission path configurations to secure a series of various transmission measurements of an electrical network over a wide range of frequencies. The transmission measuring set will be described herein with reference to a specially programmed computer control although it is to be understood that the principles of the invention may be applied equally well to a manually controlled measuring set.

The control of the measuring set is accomplished by the computer 100 generating a sequence of code words or information control signals. Each individual information control signal sets up a unique test arrangement comprising a test signal frequency including signal amplitude adjustments and a test path configuration. Upon information feedback from the measuring set to the computer 100 indicating that a particular test is complete and including a test measurement, new information control signals are generated to arrange a subsequent test arrangement. The test measurement information is printed out by the data readout 240 which may comprise teletypewriter apparatus.

The computer 100 exerts control over the various components of the measuring set by energizing selected relay coils and other equipment of the measuring set, via interface circuits, in response to the information control signals. The interface circuits, which are symbolically designated by the dotted lines 10 in FIGS. 1 and 2, interconnect each bit position output of the computer and selected inputs of the computer to the measuring set relay coils and equipment. The interface circuits translate the information control output signals of the computer to a form of control signals suitable to activate the relays and other equipment of the measuring set and also converts the measurement signals of the measuring set into a form suitable for input to the computer. The interface circuits are conventional and hence it is not believed necessary to disclose them in detail.

The test signal source 101 is adjustable to a plurality of desired signal frequencies in response to control signals supplied by a frequency selector 102 which in turn is controlled by the computer 100. The test signal source 101 may comprise a frequency synthesizer comprising a plurality of crystal oscillators with frequency multiplication and harmonic filtering to derive test signals with selected frequencies therefrom. The frequency selector 102 controls switching relays which select the desired frequency. The output of the test signal source 101 is connected to the test path 170 and to a reference path 180, via the connection selector 104. The connection selector 104 includes two switch contacts 106 and 108 and three terminals 109, 110, and 111. The switch contact 106 may be connected to the terminal 109 or 110. The switch contact 108 may be connected to the terminal 110 or 111. The particular terminals 109, 110, and 111 to which the switch contacts 106 and 108 are connected is controlled by the control signal output of the general purpose computer 100. The other switch contacts in the measuring set discussed hereinbelow are controlled in the same fashion. To connect the test signal source 101 to the test path 170 and the reference path 180, the switch contacts 106 and 108 are both connected to the terminal 110. The switch contacts 106 and 108 and the subsequent switch contacts discussed hereinbelow may comprise coaxial relay armatures with associated controlling relay coils responsive to the control signals of the computer 100.

The test signals transmitted, via the connection selector 104, are applied to a signal level control 119 which includes signal attenuation apparatus. The signal level control 119, in response to the computer 100, adjusts the test signal amplitude to a desired level. These amplitude controlled test signals are subsequently applied to the test device mounting 130, via the connection selector 116, including the switch contacts 117 and 118 connected to the A designated terminals, which in turn are connected to the sampling switch 112.

The sampling switch 112 vibrates its switch contact in a rapid periodic fashion to alternately apply the test signal to the test device mounting 130 including the electrical network under test and the standard path 136. The sampling switch 114 vibrates in synchronism with the sampling switch 112. The aforedescribed alternate sampling technique permits a rapid comparison type of signal measurement which eliminates errors in the test results due to variations of the signal level of the test signal source 101 and shifts in the operating points of the detectors 202 and 203. A discussion of the aforementioned sampling technique may be found in Electrical Engineering, Vol. 73, pp. 346–347, April 1954.

The test signals are subsequently applied via the connection selector 122, which has its switch contacts 124 and 125 connected to the A designated terminals, to the measurement frequency converter 208 which heterodynes it with a heterodyning signal generated by the converter signal source 121. The heterodyning signal frequency is slightly offset from the test signal frequency by a fixed frequency amount. The fixed difference frequency measurement signal output of the converter 208 is applied, via a bandpass filter 205 and the signal level adapter 228, to the loss and phase detectors 202 and 203. The bandpass filter 205 is tuned to the above-mentioned fixed difference frequency and the bandwidth is chosen to minimize the effects of noise, spurious products and filter response time.

The signal level adapter 228 includes the vibrating sampling switches 227 and 229 which are synchronized with the sampling switches 112 and 114. In response to the synchronized action of the sampling switches 227 and 229, the test signals traversing the standard path 136 are transmitted to the detectors 202 and 203, via the adjustable loss standard 225 and the test signals traversing the test device mounting 130, including the electrical network being tested, are transmitted, via the connecting path 224, to the detectors 202 and 203.

The adjustable loss standard 225 is adjusted in response to control signals generated by the computer 100 to adjust the total attenuation of the test or standard signals traversing the standard path 136 to an amplitude equalling approximately the amplitude of the test signal traversing the electrical network included in the test device mounting 130 and the connecting path 224. The respective amplitudes of the two signals are compared for attainment of the desired equality by the loss detector 202. The loss detector 202 is preferably a null type detector and hence detects the deviations of signals from some predetermined normal level. A null type detector suitable for use in the disclosed measuring set is described in the aforementioned Bell System Technical Journal article. The computer 100 in response to null type measurement comparisons by the loss detector 202 of the test signal and the standard signal generates control signals to adjust the adjustable loss standard 225 to achieve equalization of the amplitudes of the two signals.

The connecting path 224 and the adjustable loss standard 225 are both connected to the input of an adjustable amplifier 226. The gain of the adjustable amplifier 226 is varied in concert with the adjustment of the adjustable loss standard 225. The gain is adjusted to an amount equal to the calibrated loss of the adjustable loss standard 225. The equalized test and standard signals are thus amplified by the amplifier 226 to adjust their amplitude to some standard operating level within the optimum operating range of the loss detector 202. The variable attenuators 146 and 210 included in the signal transmission path may also be varied in response to control signals of the computer 100 to extend the available range of attenuation to permit additional signal level adjustment to meet the operating requirements of the loss detector 202, if necessary.

The test signal amplitude attenuation, due to the electrical network being tested, is measured by referring to the calibration setting of the adjustable loss standard 225 arranged to achieve the desired signal null between the test and standard signals. The aforementioned null measurement technique utilizing control loss standards makes the test measurements dependent only upon the difference between the properties of the test device mounting 130 including the electrical network under test and the standard path 136. A discussion of the theory of the null measurement technique may be found in the aforementioned Bell System Technical Journal article.

The test signals converted and transmitted by the reference frequency converter 209 included in the reference path 180 are applied to the phase detector 203 to provide a reference signal to which the phase deviations of the test and standard signals traversing the test device mounting 130 and the standard path 136 may be respectively compared.

While the aforedescribed transmission measuring set has been specifically related to the measuring set described in the aforementioned Bell System Technical Journal article, it is not intended to limit the scope of the invention to this particular measuring set.

The transmission measuring set described hereinabove includes auxiliary apparatus according to the invention to facilitate the application of the principles of the invention to utilize this measuring set to self-measure the transmission characteristics of its internal transmission components. Certain of the self-measurement techniques involve the severance of test paths and the substitution of auxiliary paths for selected signal transmission paths. Hence certain auxiliary signal sources and auxiliary signal level adjustment circuits must be inserted into the active signal transmission path to replace and compensate for the severed components to maintain acceptable signal levels for measurement purposes. The auxiliary signal source also permits the use of sampling techniques in the self-measurement of the internal components of the measuring set. Hence the self-measurements defining the accuracy of the transmission measurements of the measuring set are related on a common measuring scale to the test measurements of electrical networks. The self-measurement tests including the arrangement of signal transmission paths and the insertion of auxiliary signal control circuits may be controlled by the computer 100 in the same manner as are the standard tests of electrical networks or may be controlled manually.

The self-measurement techniques applied to the transmission measuring set described herein utilizes the measuring set instrumentation to measure the:

(1) Inaccuracies of transmission measurements of the transmission measuring set due to noise pickup and crosstalk;

(2) Transmission measurement inaccuracies due to nonlinear signal level response and signal harmonic interaction; and (3) Transmission measurement inaccuracies due to impedance imperfections which cause misterminations of the various signal transmission paths.

While the self-measuring techniques of the invention will be explained with specific reference to the aforedescribed transmission measuring set, it is to be understood that the principles of the invention are applicable equally well to many other types of transmission measuring sets including those which are manually controlled. The various self-measuring techniques are described hereinbelow in a definite sequence although it is to be understood that other sequences within the scope of the invention are equally suitable for the purpose of determining the accuracy of the transmission measuring set.

Inasmuch as all the transmission measurements of electrical networks and some of the self-measurement tests utilize rapid alternate sampling measurements, the basic signal transmission equality of the test device mounting 130 of the standard path 136 is very significant. An exact signal transmission equality means that no inaccuracies are introduced into the test measurements by the sampling technique. A very important aspect of the self-measurement of the accuracy of transmission measurement is the measurement of this comparative transmission equality. This transmission equality is measured by inserting a zero loss coaxial connector to interconnect the network receiving terminals of the test device mounting 130 and alternately sampling the test signal as alternately transmitted, via the test device mounting 130 and the standard path 136. The respective amplitude deviations of the two sampled signals as detected by the loss detector 202 represent a measure of the respective transmission equality of the two transmission paths.

Inasmuch as the test signal used in these transmission equality tests is coherent with the subsequent test signal applied to the electrical networks under test, this measured signal deviation may be applied directly to subsequent test measurement results of electrical networks to compensate for errors introduced into the test measurements by the transmission inequalities of the test device mounting 130 and the standard path 136. The compensation may be accomplished by storing the self-measurement value in the computer 100 and algebraically combining these values with subsequent test results before printout in the data readout 240 to eliminate the errors due to the transmission inequality. Other sampling arrangements included in the measuring set or the testing of alternate standard paths having fixed attenuations may be tested in the same fashion and hence a detailed description of the method as applied to these arrangements is not believed to be necessary.

The measurement techniques to determine the inaccuracies of the transmission measuring set, due to the crosstalk interaction of the transmission components of the measuring set, are conducted by interrupting the signal transmission test path 170 at selected locations where a measurement of the crosstalk level is desired. At each selected interruption location, the continuum of the test path 170 is severed and the severed ends of the test path are terminated in their characteristic impedance. The test signal source 101 is operated in this test to apply test signals to the reference path 180. Two important interruption locations are depicted herein for illustrative purposes at the connection selectors 155 and 148, respectively, located at the input and termination ends of the test path 170. To interrupt the test path 170 at its input, the connection selector 155, in response to the computer 100, connects the switch contact 156 to the terminal 157 which terminates the input end of the test path 170 in its characteristic impedance. An interruption of the test path 170 at this particular location permits the measuring set to self-measure the crosstalk pickup of the entire length of the test path 170. The source of the crosstalk pickup includes, for instance, the signals applied to the measurement converters 208 and 209 by the converter signal source 121 and the signal activity of the test signal source 101 and the reference path 180.

To conduct the crosstalk self-measurement test, the sampling switches 112 and 114 are deactivated and connected to the terminals connected to the standard path 136 to assure a continuous transmission medium for the purposes of the test. The sampling switch 227 is likewise deactivated and connected to the terminal connected to the connecting path 224.

To substitute for the standard level test signals from the test signal source 101 which normally traverse the standard path 136 and the adjustable loss standard 225, the auxiliary signal source 222 is connected to the adjustable loss standard 225 by connecting the switch contact 212 to the terminal 214. The auxiliary signal source 222 may be similar to the test signal source 101 and is designed to generate controlled auxiliary reference signals similar in amplitude to those standard level test signals transmitted by the standard path 136.

The sampling switch 229 operates in its normal vibratory sampling mode and rapidly vibrates between the terminal of the standard path 224 and the terminal of the adjustable loss standard 225 to enable the loss detector 202 to compare the signal due to crosstalk with the reference signal supplied by the auxiliary signal source 222. The adjustable loss standard 225 and the adjustable amplifier 226 are adjusted in concert as described hereinabove to adjust the amplitude of the crosstalk and auxiliary reference signal to the optimum operating range of the loss detector 202. By comparing the auxiliary reference signal with the signal due to the crosstalk, a precise measurement of the effect of crosstalk signals on the test signals traversing the entire length of the test path 170 is secured in a form identical to the form of the test measurements of electrical networks.

The specific crosstalk pickup in the latter portions of the measuring set including the frequency converter 208 may be specifically measured by severing the test path 170 from the measuring set at the connection selector 148. The input of the frequency converter 208 is terminated in a finite impedance equalling the characteristic impedance of the test path 170 by connecting the switch contact 150 to the terminal 151. The adjustable amplifier 221, controlled by the computer 100, is inserted into the signal transmission path by connecting the switch contacts 218 and 219 to its input and output terminals. The amplifier 221 is adjusted by the computer 100 to compensate for the loss of test signal amplification due to a signal amplifier included in the variable attenuator 146 located in the now disconnected test path 170. The amplifier 221 is utilized primarily to maintain the proper signal amplitude standard for measurement purposes in the same manner as are the amplifiers in the signal attenuator 146. This compensation feature is necessary because all the amplifier and attenuator adjustments are interrelated as a part of the overall test signal measuring scheme. If certain of the amplifiers are severed from the signal transmission path, another amplifier must be substituted in its stead to perform the same amplification function in the overall testing scheme.

For instance, if the signal as detected at the loss detector 202 after amplification by the adjustable amplifier 226 is still below its optimum operating range, the computer 100 will activate a certain amplifier in the signal transmission path to increase the signal level of the crosstalk signal to a more acceptable range. One of the amplifiers so activated may be included in the variable attenuator 146 now disconnected from the signal transmission path. Hence the amplifier 221 is added to the active signal transmission path and the amplification adjustments are made to it in place of the amplification adjustments normally made to the variable attenuator 146. Inasmuch as null balancing type measurement is made, the crosstalk level is measured by reference to the calibrated attenuator adjustment of the adjustable loss standard 225 needed to achieve the desired null balance.

The crosstalk tests, with the test path interruption located at the input to the frequency converter 208, is conducted in the same manner as the previous crosstalk test described hereinabove. It will be apparent to those skilled in the art that additional refinements of the crosstalk measurements to determine the precise crosstalk pickup at other specific locations in the measuring set may be made by selectively interrupting the signal transmission path at other appropriate locations and terminating the test path at these interruptions with the appropriate characteristic impedance. The aforedescribed crosstalk measurement includes noise components; however, the noise components are identified in the subsequent noise measurement test described below.

It will be apparent to those skilled in the art that, by measuring the crosstalk in the same manner as described above at various selected locations, the deterioration of the measuring set crosstalk performance may be rapidly and accurately pinpointed.

The self-measurement test to determine the effect of noise upon the measurement signal is very similar to the crosstalk test except that in the noise measurement test the test signal source is deactivated and disconnected from the measuring set by connecting the switch contact 108 to the terminal 111 thereby terminating the input of the test path 170 and the reference path 180 in their characteristic impedance. The switch contact 156 is connected to the terminal 158. This particular switching arrangement eliminates the reference path 180 as a source of crosstalk signals but includes it as a source of noise pickup and hence insures that the measured signal amplitude is due to noise only.

The sampling switches 112 and 114 are continued deactivated, as in the aforementioned crosstalk test and are connected to the standard path 136. The self-measurement test to determine noise is conducted in the same fashion as the aforedescribed crosstalk measurement and it is not believed necessary to describe it herein in detail. The measured signal level due to noise may be deducted from the signal level measured in the aforementioned crosstalk test to differentiate between the test signal distortion due to crosstalk and the test signal distortion due to noise.

Another self-measurement test related to noise measures the test signal fluctuation due to noise and is performed without interrupting the test path or disconnecting the test signal source 101. This fluctuation type noise test is performed by inserting a plurality of precisely calibrated attenuator networks, such as the tee-attenuator network 131, into the test device mounting 130 and operating the measuring set in the same manner as it is operated in making normal test measurements of electrical networks. The attenuator networks utilized in this fluctuation noise test preferably cover a range of attenuation equal to the full dynamic range of the electrical networks tested. The deviation of the null meter of the loss detector 202 from the desired standard deviation due to the attenuation of the test signal by the attenuator inserted in the test device mounting 130 is a measure of the fluctuation in the measurement signal due to noise.

The aforedescribed fluctuation type noise measurement hence presents a detailed picture of the noise contribution to the measurement signal inaccuracies over the entire amplitude range of test measurements of electrical networks. Because the noise is not periodic and hence is non-coherent with the test signals, this detected noise cannot be directly algebraically removed from the measurement signal and hence may be used only as a figure of merit of the test signal inaccuracies due to noise.

Inasmuch as the noise signal is not periodic, the noise measurements in each type of noise measurement test are repeated for a number of times to attain an average RMS signal deviation due to noise which reflects upon the accuracy of the measurement signal at each level of attenuation as inserted in the test device mounting 130.

In each of the aforedescribed crosstalk and noise measurement tests, the standard heterodyning signals normally applied to convert the test signals to the measurement signal frequency are applied to the frequency converters 208 and 209 to derive intermediate frequency measurement signals therefrom. Due to the filter action of the bandpass filter 205, only signals at the standard measurement signal frequency will be admitted to the loss and phase detectors 202 and 203. This insures that the measured noise and crosstalk will be the same signals which contribute to the distortion of the measurement signal derived from actual test signals for the regular measurement tests of electrical networks.

The self-measurement operation to determine the inaccuracies caused in the measurement signal, due to the various harmonics of the generated test signal, is performed by reconnecting the test signal source 101 to the test path 170. This connection is made by connecting the switch contacts 106 and 108 to the terminal 110 and the switch contact 156 to the terminal 158. The sampling switches 112 and 114 are deactivated as in the previous test and connected to insert the standard path 136 into the test path 170. The converter signal source 121, in response to the control signals of the computer 100 and the frequency selector 102, applies a series of offset converter signal frequencies to the frequency converter 208 to heterodyne in sequence selected harmonics of the various generated test signals. These offset converter signal frequencies are selected to be almost equal to integral multiples of each of the basic test signal frequencies selected. The offset signal frequency is slightly increased from the aforementioned integral multiple frequency by a small difference frequency equal to the standard frequency of the measurement signal as measured by the measuring set instrumentation. The intermediate frequency signals derived from selected harmonics are applied to the loss detector 202. The signal amplitude measured therein is a measure of the extent to which the various harmonics exist in the measuring signal and hence are a measure of its signal frequency purity.

The linearity of the transmission measuring set transmission components including the frequency converter 208 should preferably be well defined since all test signal amplitude are translated to a common intermediate frequency measurement signal amplitude before they are applied to the loss and phase detectors 202 and 203. The self-measurement tests, to determine the linearity of the measuring set including the frequency converters in transmitting various amplitudes of the test signals, are conducted by applying test signals with precisely controlled signal amplitudes to the measuring set transmission components being tested and noting the response of the test signal to a signal amplitude control subsequent to these transmission components. The measuring set as shown in FIGS. 1 and 2 is arranged by the positioning of the variable attenuators 146 and 210 to test only the linearity of the frequency converter 208. To include other measuring set transmission components in the linearity test requires that they be positioned intermediate to the variable attenuators 146 and 210. The signal level control 119 may be used in the same fashion as the variable attenuators, if desired.

In the performance of the self-measurement operation to determine the signal level response linearity of the frequency converter 208, a special T-attenuator circuit 131 is inserted into the test device mounting 130 to induce a precise measured signal attenuation into the test signal traversing the test device mounting 130. This is to insure that the test signal amplitude as traversing the test device mounting is adjusted to a precise reference signal level relative to the standard path 137 to permit accurate ratio measurements to be made by the aforementioned sampling technique.

The switch contacts 117, 118, 124, and 125 are respectively connected to their B terminals to include the auxiliary standard path 137 in the signal transmission test path 170 in place of the standard path 136. The auxiliary standard path 137 is connected to the signal transmission test path 170, via signal transmission and sampling circuitry specifically designed to maintain constant input and output impedances to the auxiliary standard path 137 and the test device mounting 130. These constant impedance circuits prevent changes in the characteristic impedances of the test path as the signal level control 119 or the variable attenuators 146 and 210 are adjusted to different attenuation values in the test path. Thus the signal measurements made are a true indication of the linearity of the various internal signal transmission components of the transmission measuring set.

The input circuit connection from the test path 170 to the auxiliary standard path 137 and the test device mounting 130 comprises a signal splitting pad including the resistors 166 and 167. The output circuit connection from the auxiliary standard path 137 and the test device mounting 130 to the test path 170 comprises a special constant excitation sampling switch 160 including the individual vibrating sampling switch contacts 162, 163, 164, and 165. Each pair of sampling switch contacts 162 and 164 or 163 and 165 in their one terminal position are connected to an isolating amplifier 161 which has a constant high input impedance. Each pair of sampling switch contacts as connected to the other terminal position are connected to the grounded terminal impedances 170 and 171 which are equal in magnitude to the input impedance of the amplifier 161. The sampling switch contacts 162 through 165 are synchronized so that while two of the switches connect the auxiliary standard path 137 or the test device mounting 130 to the amplifier 161, the other two are connected to the grounded terminal impedances 170 and 171. The use of the paired arrangement of the switch contacts 162 through 165 is utilized to inhibit the transmission of crosstalk signals through the constant excitation sampling switch.

The values of the resistors 168 and 169 are selected so that the total impedance of the parallel connected impedance of the impedances 169 and 170 or 168 and 171 equals the parallel input impedance of the amplifier 161 as connected in parallel with the impedance 168 or 169. These parallel impedance combinations are designed to have an impedance magnitude which is substantially equal to the characteristic impedance of the test path transmission components. The above-described parallel impedances advantageously terminate the test device mounting 130 and the auxiliary standard path 137 in the characteristic impedance of the test path 170 to minimize signal reflections while the high input impedance of the isolation amplifier 161 isolates the signal transients due to the switching action of the sampling techniques from the measuring instrumentation of the measuring set.

The same test signal frequencies and amplitudes are generated for the linearity test as are generated for the regular testing of electrical networks. The test signals are applied to the test path 170. The test device mounting 130 and the auxiliary standard path 137 are alternately sampled in response to the rapid periodic switching action of the sampling switch contacts 162, 163, 164, and 165 as described hereinabove.

The signal transmission path includes the variable attenuators 146 and 210 which are located both prior to and subsequent to the measurement frequency converter 208. Each of the variable attenuators 146 and 210 may include a plurality of calibrated attenuator pads and signal amplifiers which may be selectively inserted in the signal transmission path to effect various controlled degrees of signal attenuation or amplification. For the purposes of a linearity test of the measurement frequency converter 208, the variable attenuators 146 and 210 are adjusted in concert so that a change in the attenuation or amplification of the test signal by the attenuator 146 is coupled to an equal and oppositely directed change in attenuation or amplification of the measurement signal by the attenuator 210. The attenuator 146 is varied to alter the test signal to a plurality of levels at each test signal frequency and the attenuator 210 is likewise varied to neutralize this change induced in the measurement signal level subsequent to the frequency converter 208. The loss detector 202 appraises the changes from the original signal transmission ratio which are induced by the nonlinearity of the level response of the frequency converter 208. These changes from the original signal transmission ratio are a direct measure of the linearity of the frequency converter 208 at the various test signal levels and is also a measure of the degree of inaccuracies induced into the measurement signal due to the nonlinearity of the frequency converter 208. These measured inaccuracies may be combined directly with the measurement signal to compensate for these inaccuracies as they occur in regular test measurements of electrical networks.

At certain test signal frequencies a significant source of inaccuracy results from the intermodulation of harmonics of the test signal and the heterodyning signal during frequency conversion. A difference frequency signal, referred to herein as spurious frequency signals is due to the intermodulation of the harmonics at certain test signal frequencies which produce a spurious frequency signal of the same frequency as the standard test measurement intermediate frequency signal applied to the detectors 202 and 203. These particular spurious frequency signals introduce undesired signal components into the measurement signals. The particular test signal frequencies at which these spurious frequency signals exist is determined by examining the various harmonic frequency combinations of the test and heterodyning signals to locate those frequency combinations capable of producing an intermediate frequency signal equalling the frequency of the standard test measurement intermediate frequency signal. One method of predicting the existence of these particular spurious frequency signals which are intermodulation products of harmonics is disclosed in Electronics, vol. 24, pp. 132–134, April 1951 and hence the method by which their existence is determined need not be disclosed herein in detail. Once the particular aforementioned spurious frequency signals have been located by the aforementioned means, the precise influence they wield on the accuracy of the measurement signals is measured.

Since the spurious frequency signal in question is not filterable from the actual standard measurement signal, the amplitude of this spurious frequency signal cannot be directly measured and hence its amplitude is inferred by measuring the amplitude of a counterfeit spurious frequency signal generated by a heterodyning signal and a test signal slightly offset in frequency from the normal heterodyning and test signals which generate a counterfeit spurious frequency signal equal in frequency to the spurious frequency signal in question. The intermediate frequency measurement signal derived therefrom differs from the frequency of the standard measurement signal and hence is blocked by the filter 205 from application to the loss detector 202. The counterfeit spurious frequency signal derived from the harmonics of these offset signals is equal in frequency to the standard measurement signal frequency and hence is transmitted by the filter 205 to the loss detector 202 where its amplitude is measured. The exact signal frequency offsets may be selected in accordance with a chart reproduced in the aforementioned "Electronics" article reference by plotting a point on an appropriate difference frequency line (depending on the harmonic being investigated) close to its intersection with the line plotting the test signal frequency on the chart. The test signal frequency and the heterodyning signal frequency are selected in accord with this plotted point. This frequency selection procedure will be obvious to those skilled in the art upon inspection of the chart. These offset frequencies may also be selected in accord with an analytical procedure where particular harmonics are to be investigated.

If XT is the test signal harmonic and YH is the heterodyning signal harmonic to be investigated, the particular frequencies that produce the spurious frequency signal in question is defined by the relation $$XT \pm YH = M \quad (1)$$

where:

M is the standard measurement signal intermediate frequency, the test signal frequency T and the heterodyning signal frequency H must be offset to the values $T'$ and $H'$ so that the basic intermediate frequency signal is not transmitted by the filter 205 or $$T' - H' = M + \Delta \quad (2)$$

where $\Delta$ is the offset of the intermediate frequency signal and $T'$ and $H'$ are the offset test and heterodyning signal frequencies.

From the Equations 1 and 2 assuming $T = T'$ and $H = H'$, suitable offset signal frequencies for the purposes of the test are defined by the relations $$H' = \frac{\pm M - (M + \Delta)X}{X + Y} \quad (3)$$

$$T' = H' + (M + \Delta) \quad (4)$$

In performing the aforementioned self-measurement operation to measure the effect of spurious frequency signals on test measurements, the sampling switches 112 and 114 are deactivated and positioned to form a signal transmission path including the standard path 136. The auxiliary signal source 222 is connected, via the adjustable loss standard 225, to the loss detector 202 by connecting the switch contact 212 to the terminal 214. The auxiliary signal source 222 provides, as described above, a reference signal amplitude against which the counterfeit spurious frequency signal may be compared by sampling techniques. As described above, the existence of particular spurious frequency signals which equal the measurement signal frequency may be determined by graphical or analytical methods. A counterfeit spurious frequency signal corresponding to each existing spurious frequency signal is measured to determine its effect on the measurement signal.

To measure the amplitude of a particular counterfeit spurious frequency signal, a test frequency is generated by the test signal source 101 which is slightly offset by a few kHz. from the test signal frequency containing the harmonics which would generate the actual spurious frequency signal. An offset heterodyning signal is supplied by the converter signal source 121 to produce by intermodulation with the offset test signal frequency an intermediate frequency signal slightly offset from the standard measurement intermediate frequency signal by a few kHz. This signal is hence blocked from application to the loss detector 202 by the filter 205 which is precisely tuned to the standard measurement signal intermediate frequency. The intermodulation of the harmonics of the offset test signal and the offset heterodyning signal will, however, produce counterfeit spurious frequency signals which are equal in frequency to the standard measurement intermediate frequency signals. Because of the proximity in frequency of these harmonics to the harmonics producing the actual spurious frequency signal, this measured counterfeit frequency signal provides a reliable indication of the amplitude of the actual spurious frequency signals produced by the test signal harmonics and their effect on the measurement signals.

As indicated hereinabove, impedance imperfections and variations from the characteristic impedance in the various transmission components of the test path 170 cause signal reflections or attenuations which significantly adversely affect the test signals traversing the test path 170 and thereby degrade the accuracy of test measurements.

To determine the extent of the measuring set inaccuracies due to these attenuations and reflections of the test signal, it is necessary that the deviation from the actual characteristic impedance of the various transmission components of the test path 170 in the working context of the measuring set be accurately measured. In measuring these impedance imperfections, the test path 170 is disconnected from the balance of the measuring set by switching the switch contact 156 to the terminal 157 and the switch contact 149 to the terminal 152. This switching arrangement hence terminates the input and output terminal ends of the test path 170 in finite termination impedances which are substantially equal to the characteristic impedance of the transmission components comprising the test path 170.

The switch contact 106 is connected to terminal 109 and the switch contact 150 is connected to terminal 153 to insert the auxiliary test path 140 into the transmission measuring set in place of the test path 170. The auxiliary test path 140 includes the sampling switches 141 and 142 which alternately transmit test signals through a signal path containing a T-junction 144 and a standard path 145. This alternate sampling arrangement, as described hereinabove, prevents errors in the test measurements due to variations of the operating level of the test signal source and shifts of the operating point of the loss and phase detectors 202 and 203.

The T-junction 144 comprises a coaxial connector including a T-stub to which the coaxial transmission facilities of the test path 170 may be coupled, via a coaxial cable connector 132 or 134, in a bridging configuration.

The switch contacts 218 and 219 are connected to permit the signal transmission path to bypass the amplifier 221. The switch contact 212 is connected to the terminal 215. The sampling switches 227 and 229 vibrate in synchronism with the sampling switches 141 and 142 to alternately apply the measurement signal to the connecting path 224 and the adjustable loss standard 225.

The individual mounting terminals of the test device mounting 130 are each individually connected in sequence to the T-stub of the T-junction 144 by means of the low loss coaxial cable connectors 132 and 134. These connections hence bridge the disconnected sections of the test path 170 across the auxiliary test path 140. The test signals applied to the auxiliary test path 140 are transmitted thereon and the attenuation of the test signal caused by each one of the bridged disconnected sections of the test path 170 is measured by the loss detector 202.

The attenuated test signals are transmitted, via the frequency converter 208 and the signal level adapter 228 to the loss detector 202. The effect of the added line length introduced into the bridged test path 170 by the coaxial cable connections 132 and 134 may be readily removed from the measured test signal results by computation by making appropriate calibrations at the measurement plane of interest with coaxial termination standards, as described below. The resulting signal values represent a measure of the deviation of each section of the test path 170 from its characteristic impedance.

The actual characteristic impedance of each of these bridged disconnected portions of the test path 170 may be determined subsequently by measuring the effect of selected calibration networks on the same test signals which are bridged across the auxiliary test path 140 by connection to the T-junction 144. These calibration networks comprise a short circuit network, an open circuit network, and a finite impedance network. A theoretical discussion of how to utilize the aforementioned calibration and impedance imperfection signal measurements to accurately calculate the actual impedance of a bridged network may be found in the aforementioned text "Microwave Measurements" and hence is not discussed herein in detail.

The aforementioned self-measurement techniques generate a series of signal measurements indicative of the internal transmission characteristics of the measuring set transmission components which are expressed in terms of decibels of amplitude loss induced in the test signal amplitude. Certain of these self-measurements are utilized to directly modify test measurement readings. All of the self-measurements are used as a set of measurement criteria by which the performance of the measuring set accuracy is gauged. Self-measurements, in which the signal measured is coherent with the test signal measurement, may be combined with these test signal measurements to eliminate signal components from the measured test signal due to the transmission characteristics of the measuring set transmission components. This may be done by manual computation or the results may be stored in the computer 100 which utilizes them to automatically correct the test signal measurements before printout in the data readout 240. The self-measurements which are amenable to this treatment are those derived from the aforementioned transmission equality test, the linearity test and the impedance imperfection test using calibration standards. While the measured noise signal is not coherent with the test signal, the average value obtained by the aforementioned averaging technique may be likewise combined with the test signal measurements. The test results of all of the self-measurement techniques are utilized as an evaluation measure of the performance of the measuring set. The self-measurements are performed when the measuring set is constructed and subsequent self-measurements are utilized to provide measurement criteria concerning the subsequent performance of the measuring set.

It will be apparent to those skilled in the art that the aforedescribed measuring techniques advantageously measure the various transmission characteristics of the transmission components of the measuring set, and also utilize the same measuring instrumentation utilized in the measurement of the electrical networks to be tested thereby permitting the establishment of a reference figure of accuracy on a common scale with the test measurements of electrical networks.

While the above invention has been described with respect to one specific illustrative embodiment, many variations of the invention will suggest themselves to those skilled in the art without departing from the spirit and scope of the invention.

What is claimed is:

1. A method of self-measuring the transmission characteristics of a transmission measuring set to determine its accuracy of measurement comprising the steps of disconnecting the signal transmission test path including a test network receiving means from the transmission measuring set, inserting an auxiliary transmission path in the transmission measuring set in place of said test path, bridging portions of said test path across said auxiliary path, applying test signals to said auxiliary path, converting said test signals to a common frequency measurement signal at the termination of said auxiliary path, and measuring the attenuation imposed by said bridged portion of said test path upon said test signals by measuring said measurement signal with the measuring instrumentation of said transmission measuring set, reconnecting said test path to said transmission measuring set applying test signals to said test path and converting said test signals to a common frequency measurement signal at the termination of said test path for measurement purposes, attenuating said test signal prior to said frequency conversion operation, negating said attenuation subsequent to said frequency conversion operation by increasing the amplitude of said common frequency measurement signal by an amount equal to said attenuation of said test signal and measuring the signal level response of said common frequency measurement signal to said attenuation operation with the measuring instrumentation of said transmission measuring set, interrupting said test path at a selected location and terminating said test path at said selected location in its characteristic impedance, generating test signals, applying said test signals to said measuring set, converting the frequency of the electrical disturbances in said test path due to the crosstalk coupling of said test signals to a common frequency crosstalk signal, and measuring the signal level of said crosstalk signal with said measuring instrumentation.

2. A method of self-measuring the transmission characteristics of a transmission measuring set as defined in claim 1 further including the steps of applying test signals to said test path, generating heterodyning signals offset from the frequency of said test signals by an integral factor of the said test signal frequency plus a frequency difference equal to said common frequency of said measurement signal, utilizing said offset heterodyning signal in a frequency conversion operation to heterodyne selected harmonics of said test signal to derive therefrom an intermediate difference frequency signal at said common frequency, and measuring the signal level of said intermediate difference frequency signal with said measuring instrumentation as a measurement of the harmonics in said test signal.

3. A method of self-measuring the transmission characteristics of a transmission measuring set as defined in claim 2 further including the steps of inserting a zero loss connecting network in the said test network receiving means of said test path intended to receive electrical networks to be tested, applying said test signals alternately to said zero loss connecting network and to a standard path paralleling the said test network receiving means of said test path, sampling said alternately applied test signals as transmitted by said zero loss connecting network and said standard path, converting said sampled test signals to alternate common frequency measurement signals, and comparing the respective signal attenuation induced in the said alternate measurement signals by said zero loss connecting network and said standard path, respectively, to determine the relative signal transmission equality of said zero loss connecting network and said standard path.

4. A method of self-measuring the transmission characteristics of a transmission measuring set as defined in claim 3 further including the steps of disconnecting said test signal source from said measuring set and terminating the input of the said test path in its characteristic impedance, converting the frequency of the electrical disturbances in said test path due to noise pickup to a common frequency noise signal, applying a standard measurement signal level to the measuring instrumentation of said measuring set, and measuring the signal level of said noise signal with reference to said standard measurement signal level with said measuring instrumentation as a measure of the noise pickup of said test path.

5. A method of self-measuring the transmission characteristics of a transmission measuring set as defined in claim 4 further including the steps of offsetting the said test signal and offsetting the said heterodyning signal to predetermined frequencies specifically selected to produce through intermodulation with selected harmonics of said offset test signal an intermediate spurious frequency signal whose frequency is equal to the frequency of the said common frequency of said measurement signal applied to said measuring instrumentation and measuring the amplitude of said spurious frequency signal with said measuring instrumentation.

6. A method of self-measuring the transmission characteristics of a transmission measuring set as defined in claim 5 further including the steps of inserting a fixed attenuator network in said test path, applying test signals to said test path and noting the fluctuaion of said measurement signal from the attenuation level induced in said test signal as a measure of the noise pickup of said measuring set.

7. In an automated transmission measuring set whereby the transmission characteristics of an electrical network are measured by generating a plurality of test signals at selected frequencies, applying said test signals to one end of a test path including said electrical network connected to mounting terminals therein, converting the test signals at the other end of said test path to measurement signals of one frequency, and applying said measurement signals to detection apparatus to measure the phase and amplitude thereof, the method of determining the degree of inaccuracy of said measured signal due to the signal transmission characteristics of the internal transmission components of said automated transmission measuring set comprising the steps of inserting a fixed attenuator network into the mounting terminals of said test path in place of said electrical device, shunting said mounting terminals with a signal strap transmission component, splitting the test signal and applying it simultaneously to said fixed attenuator network and said signal strap transmission component; alternately sampling the test signal as transmitted by said signal strap and said fixed attenuator network by alternately connecting said fixed attenuator network and said signal strap to a terminating impedance and an isolation amplifier each connected in parallel with an impedance, said isolation amplifier being connected to said test path, said terminating impedance and said isolation amplifier each connected in combination with its parallel connected impedance, each of said connection combinations of said terminating impedance and said isolation amplifier having an impedance value equal to the characteristic impedance of said internal transmission components and hence presenting a constant input impedance to eliminate signal transients due to the sampling process; altering the test signal amplitude by a fixed amount in one direction of attenuation prior to said frequency conversion operation, altering the measurement signal amplitude as converted to said one frequency by said frequency conversion operation subsequent to said frequency conversion operation, by a fixed amplitude amount in a direction opposite to said one direction, measuring the measurement signal response to said signal attenuation alteration operations at said detection apparatus, disconnecting the input and output end terminals of said test path from said transmission measuring set, terminating the said disconnected end terminals in finite impedance terminations substantially equal to the characteristic impedance of the said internal transmission components, substituting an auxiliary path in said transmission measuring set for said disconnected test path; bridging the disconnected portions of said test path across said auxiliary path by coupling the mounting terminals of said test path to said auxiliary path, applying a plurality of test signals at preselected frequencies to said auxiliary path, and measuring the attenuation caused by the said bridged portion of said test path by measuring the amplitude of said measurement signal derived from said plurality of test signals applied to said auxiliary path with said detection apparatus.

8. The method of determining the degree of inaccuracy in a test signal and in the measurement signal derived therefrom due to the signal transmission characteristics of the internal transmission components of a transmission measuring set as defined in claim 7 further including the steps of disrupting the signal transmission test path at selected intervals to isolate the said test signals therefrom and terminating the test path at each of said interruptions with an impedance termination substantially equal to the characteristic impedance of said internal transmission components, applying a standard measurement signal level to said signal detection apparatus and measuring the amplitude of the measurement signal derived from the signal disturbance level in said interrupted test path with respect to said standard level measurement signal by alternately sampling said standard level measurement signal and said disturbance derived measurement signal, and amplifying said disturbance derived measurement signal to compensate for the disengagement of signal amplifiers from the measuring set due to said selected interruptions, said disturbance derived measurement signal representing a measure of the crosstalk interaction in the internal signal transmission components isolated from said test signals by said interruptions.

9. The method of determining the degree of inaccuracy in a test signal and in the measurement signal derived therefrom due to the signal transmission characteristics of the internal transmission components of the transmission measuring set as defined in claim 8 further including the steps of applying test signals to said test path, generating heterodyne signals offset from the test signal frequency by the fixed frequency of said measurement signal plus an integral factor of the test signal frequency to heterodyne selected harmonics of said test signal, combining said offset heterodyning signal with said test signal to derive therefrom by said frequency conversion operation an intermediate difference frequency signal whose frequency equals that of said common frequency of said measurement signal, measuring the signal level of said intermediate difference frequency signal resulting from said frequency conversion operation applied to said harmonics to provide therefrom a measurement of the harmonics in said test signal.

10. A method of determining the degree of inaccuracy in a test signal and in the measurement signal derived therefrom due to the signal transmission characteristics of the internal transmission components of a transmission measuring set as defined in claim 9 further including the steps of inserting a zero loss connecting network in the said mounting terminals of said test path, applying said test signals alternately to said zero loss connecting network and to a standard path paralleling said mounting terminals of said test path, alternately sampling the amplitude of the test signal subsequent to traversing said zero loss connecting network and said standard path, and comparing the respective signal attenuations imposed upon said test signal to determine the relative signal transmission characteristics of said test path as including said zero loss connecting network and as including said standard path.

References Cited
UNITED STATES PATENTS

| | | | |
|---|---|---|---|
| 3,355,662 | 11/1967 | Haynie et al. | 324—57 |
| 3,404,338 | 10/1968 | Cannon | 324—57 |
| 3,409,829 | 11/1968 | Elmore et al. | 324—74 |

KATHLEEN H. CLAFFY, Primary Examiner

A. B. KIMBALL, JR., Assistant Examiner

U.S. Cl. X.R.

179—175; 324—57, 74